United States Patent [19]
Fuse

[11] Patent Number: 5,796,350
[45] Date of Patent: Aug. 18, 1998

[54] AUTOMOBILE SCREEN CONTROL APPARATUS

[75] Inventor: Hidefumi Fuse, Nishikamo-gun, Japan

[73] Assignee: Toyota Jidosha Kabushiki Kaisha, Toyota, Japan

[21] Appl. No.: 810,471

[22] Filed: Mar. 4, 1997

[30] Foreign Application Priority Data

Mar. 13, 1996 [JP] Japan ................... 8-056201

[51] Int. Cl.[6] .................................. G08B 1/00
[52] U.S. Cl. ............... 340/815.75; 340/439; 340/461; 340/980; 340/815.4; 345/7.8
[58] Field of Search ................ 340/815.4, 815.75, 340/461, 705, 980, 901, 905, 933, 439, 505; 250/222.1; 307/10.1; 345/7.8, 9

[56] References Cited

U.S. PATENT DOCUMENTS

| | | | |
|---|---|---|---|
| 4,882,565 | 11/1989 | Gallmeyer | 340/461 |
| 5,051,735 | 9/1991 | Furukawa | 345/7 |
| 5,153,751 | 10/1992 | Ishikawa et al. | 359/13 |
| 5,214,413 | 5/1993 | Okabayashi et al. | 345/7 |
| 5,302,819 | 4/1994 | Kassies | 250/222.1 |
| 5,451,941 | 9/1995 | Lamazou et al. | 340/933 |
| 5,521,823 | 5/1996 | Akita et al. | 364/45 |
| 5,539,397 | 7/1996 | Asanuma et al. | 340/901 |
| 5,567,004 | 10/1996 | Pietzsch | 180/326 |

FOREIGN PATENT DOCUMENTS

| | | |
|---|---|---|
| 3245299 | 6/1984 | Germany . |
| 3346370 | 7/1985 | Germany . |
| 4419836 | 12/1995 | Germany . |
| 62-168020 | 7/1987 | Japan . |
| 7-117559 | 5/1995 | Japan . |

*Primary Examiner*—Edward Lefkowitz
*Assistant Examiner*—Davetta Woods
*Attorney, Agent, or Firm*—Cushman Darby & Cushman IP Group of Pillsbury Madison & Sutro LLP

[57] ABSTRACT

A display (4) has its representation made by brightness of a backlight (7). A left flasher (SW 1) and a lighting (SW 3) supply on/off information to a dimming judgement unit (9). The dimming judgement unit (9) determines that when the lighting (SW 3) is turned on the environment is dark, and detects that a vehicle is going to make a left turn when the left flasher (SW 1) is turned on. It is further assumed according to the left turn of the vehicle that the driver's line of sight is turned to the left, and luminance of the backlight (7) is lowered. It is thus possible to prevent driver annoyance with a bright display (4), even when the display (4) comes within the driver's line of sight.

14 Claims, 7 Drawing Sheets

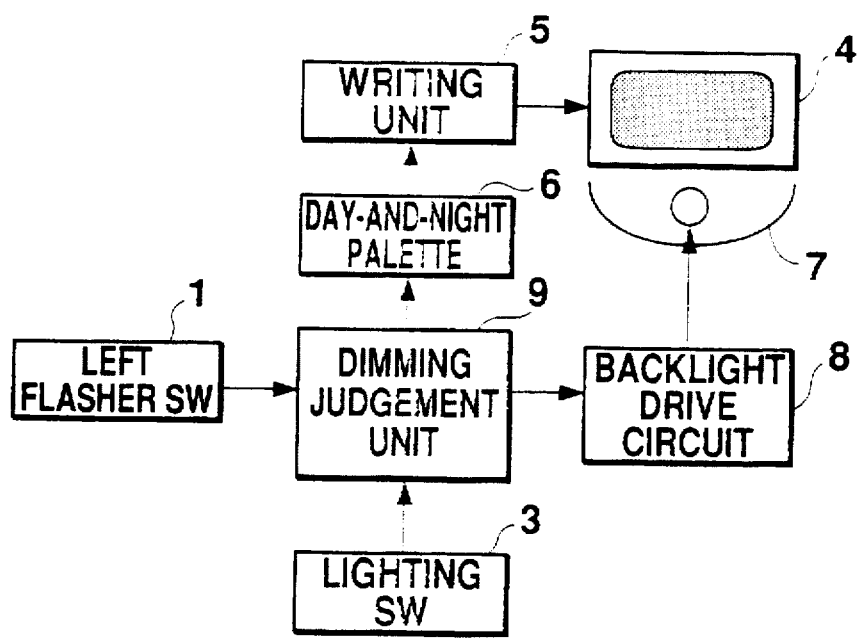
Fig. 1
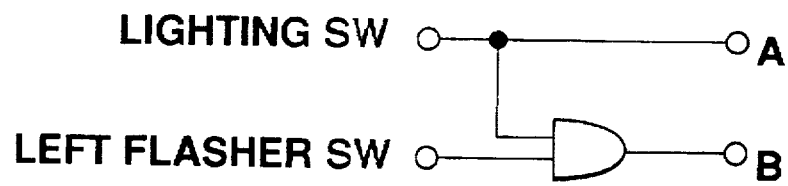
Fig. 2
|  | B ON | B OFF |
|---|---|---|
| A ON | NIGHTTIME PALETTE | ← |
| A OFF | DAYTIME PALETTE | ← |
Fig. 3

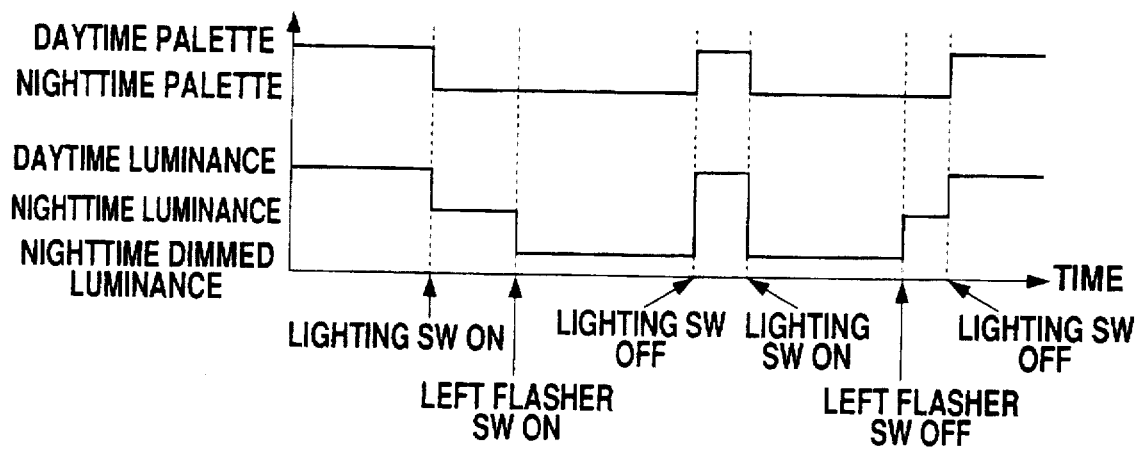
Fig. 4
Fig. 5
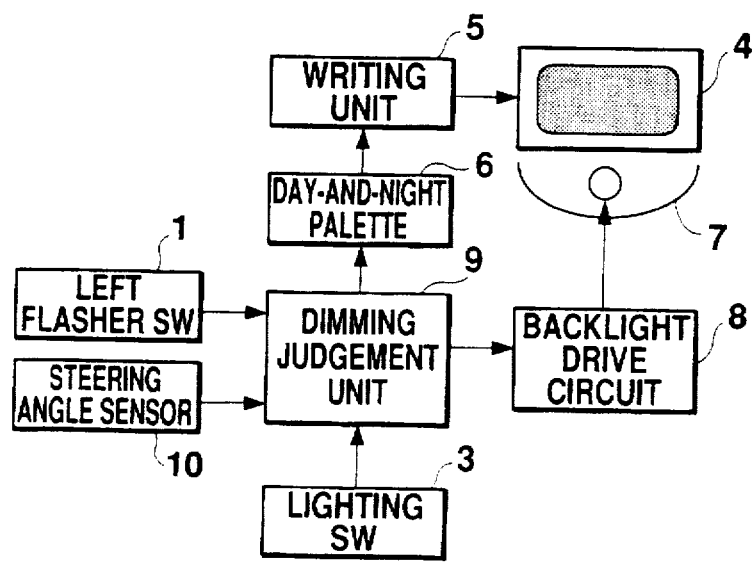
Fig. 6

AUTOMOBILE SCREEN CONTROL APPARATUS

BACKGROUND OF THE INVENTION a) Field of the Invention

This invention relates to an automobile screen control apparatus for controlling the screen of a display which is mounted on an automobile to show various types of information, and more particularly to an apparatus which prevents the display screen from disturbing the driver.

b) Description of the Related Art

Increasingly, vehicles are equipped with displays for showing various types of information. Especially, navigation system displays which display maps to indicate where the driver is driving are increasing.

There have been also proposed systems which include a display usable as a touch panel to control various types of equipment such as air conditioners and audio systems.

Such vehicle-mounted displays show a large amount of information and are require relatively large screens. For example, the navigation displays generally have a size of about 5 to 6 inches. And, the above-described display used as a touch panel is required to have a screen with an appropriate size in view of the operability of various types of equipment.

Also, such a navigation display changes from moment to moment to indicate where the driver is driving. Therefore, the screen of the vehicle-mounted display is very annoying to the driver when it is within the driver's line of sight.

For example, when a vehicle with a steering wheel on the right side is making a left turn, the driver looks ahead to the left, so that the vehicle-mounted display comes within the driver's sight. Especially, when the environment is dark, at the night or within a tunnel, there is a disadvantage that the screen of the display is very prominent, and the driver may find the display annoying. Also, when a vehicle has the steering wheel on the left side, the display comes within the driver's sight when the vehicle makes a right turn.

SUMMARY OF THE INVENTION

It is an object of the invention to provide an automobile screen control apparatus for controlling the screen of a display so that the driver is not annoyed by the display.

The invention relates to an automobile screen control apparatus for controlling a display screen mounted in a vehicle to indicate various types of information. The apparatus is characterized by the function of making the display inconspicuous when it is assumed that the display comes within a driver's line of sight and the driver will find the screen of the display annoying.

For brightness of the environment, an illumination sensor may be used to detect brightness inside or outside the vehicle. The simplest way to determine that head lamps are on is to refer to a state of a lighting SW. The means for assuming a field of view where the driver's eyes are directed may be selected from various types of devices. For example, when the vehicle having the steering wheel on the right side makes a left turn or a lane change to the left, the driver's eyes are turned to the left side, and the display may come within sight of the driver. Accordingly, in view of a state of a left turn signal flasher (hereinafter referred to as the left flasher) SW, it is detected that the left flasher is on and the driver's sight is turned to the left. The driver's line of sight directed to the left can also be assumed by detecting steering operation to turn the steering wheel to the left. Furthermore, the driver's line of sight directed to the left can be assumed by taking a picture of the driver's eyes with an eye camera and detecting the direction of the driver's eyes. When the vehicle has the steering wheel on the left side, it is assumed according to the operation of the right flasher and the steering wheel to the right that the driver's line of sight is turned to the right and the display has come within sight of the driver.

Further, when the environment is dark and the driver's line of sight is turned to the left (or the right), the display screen comes within view of the driver. In such a case, when the environment is dark at night and the screen is felt to be relatively bright, the driver often finds the screen to be annoying. Therefore, judging means determine such situations, and a screen control means operate to darken the screen to make it relatively inconspicuous. Thus, the driver does not feel that the display is annoying. The screen may also be darkened or turned off.

Another embodiment according to the invention detects an obstacle which is located in the line of sight where the display is positioned when viewed from the driver. Thus, when an obstacle is detected, it is highly possible that the driver's line of sight is tuned to that obstacle. Especially, when an alarm is issued upon detecting the obstacle, it is quite possible that the driver's line of sight is turned to the obstacle. Therefore, when the obstacle which is located ahead to the left (or the right) is detected, the driver's line of sight turned to the left (or the right) may also be assumed.

An additional embodiment according to the invention includes a vehicle speed detector for detecting vehicle speed. When it is determined according to the result detected by the vehicle speed detector that the vehicle speed is more than a prescribed value, the screen control means operate to prohibit change to an inconspicuous state.

When the vehicle is running at a high speed along a highway, the driver's line of sight is focused on a very far point. Therefore, even when the driver's eyes are moved to the left, the display would not enter greatly into the driver's line of sight because the movement of the eyes is slight. In such a situation, it is judged better that the display not be made inconspicuous, and the above-described control is prevented from being performed, allowing better control to be made.

Still another embodiment according to the invention determines urgency of the content shown on the screen. When the content is determined to be urgent, the screen control means prohibits change to an inconspicuous state.

It is desirable that alarms such as high water temperature or low fuel level be noticed by the driver as soon as possible, and it is preferable to call the driver's attention repeatedly until such conditions are remedied. Accordingly, when such urgent information is shown on the display, it is preferable not to make the screen inconspicuous. The above-described control is therefore prohibited from being performed so that the control can be effected more expediently.

BRIEF DESCRIPTION OF THE DRAWINGS

FIG. 1 is a block diagram showing the configuration of a first embodiment.

FIG. 2 is a diagram showing an example of the configuration of a dimming judgement unit 9.

FIG. 3 is a diagram to describe the judgment made by the dimming judgement unit 9.

FIG. 4 is a diagram to describe the judgment made by the dimming judgement unit 9.

3

FIG. 5 is a timing chart showing an example of dimming control in the first embodiment.

FIG. 6 is a block diagram to show the configuration of a second embodiment.

Figure 7:
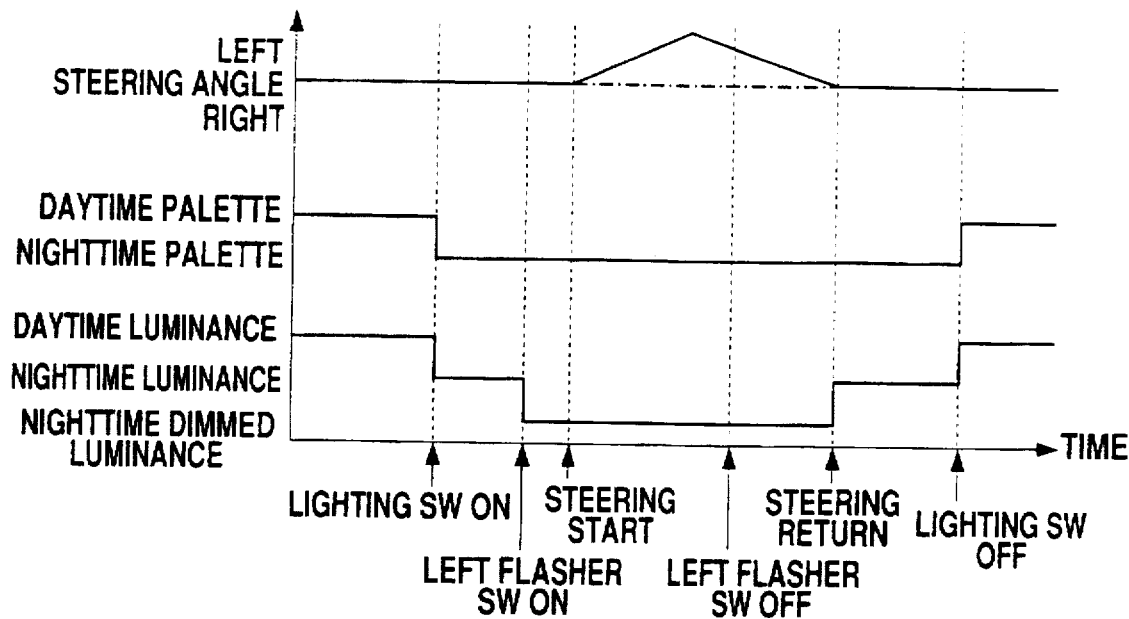

FIG. 7 is a timing chart showing an example of dimming control in the second embodiment.

Figure 8:
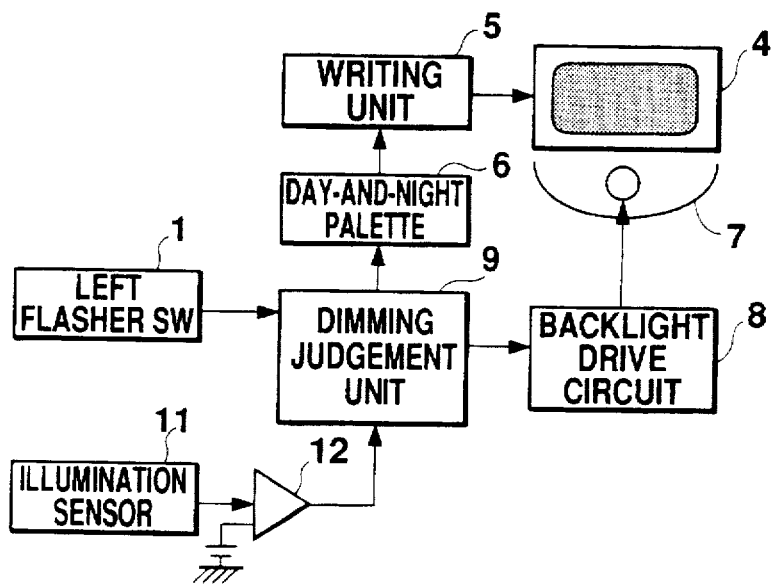

FIG. 8 is a block diagram to show the configuration of a third embodiment.

Figures 9A, 9B, 9C:
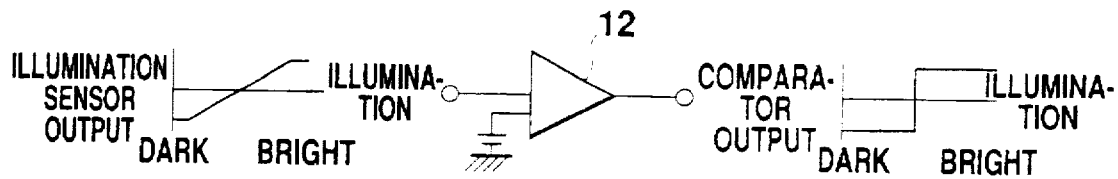

FIG. 9(a), 9(b) and 9(c) are explanatory diagrams showing the output process from a sensor.

Figure 10:
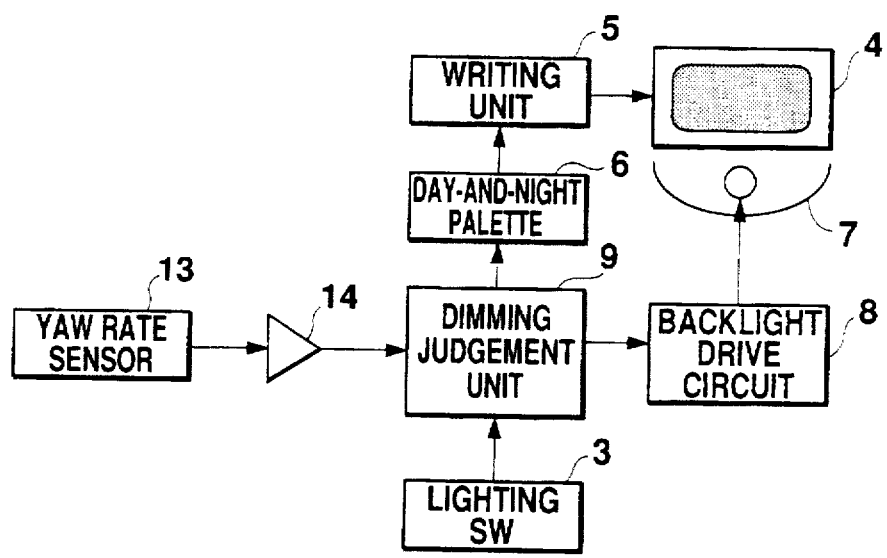

FIG. 10 is a block diagram showing the configuration of a fourth embodiment.

Figures 11A, 11B, 11C:
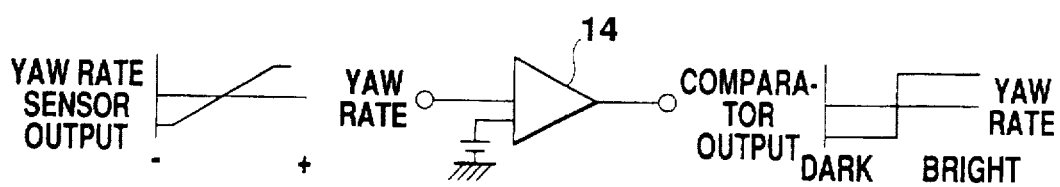

FIG. 11(a), 11(b) and 11(c) are explanatory diagrams showing the output process from a sensor.

Figure 12:
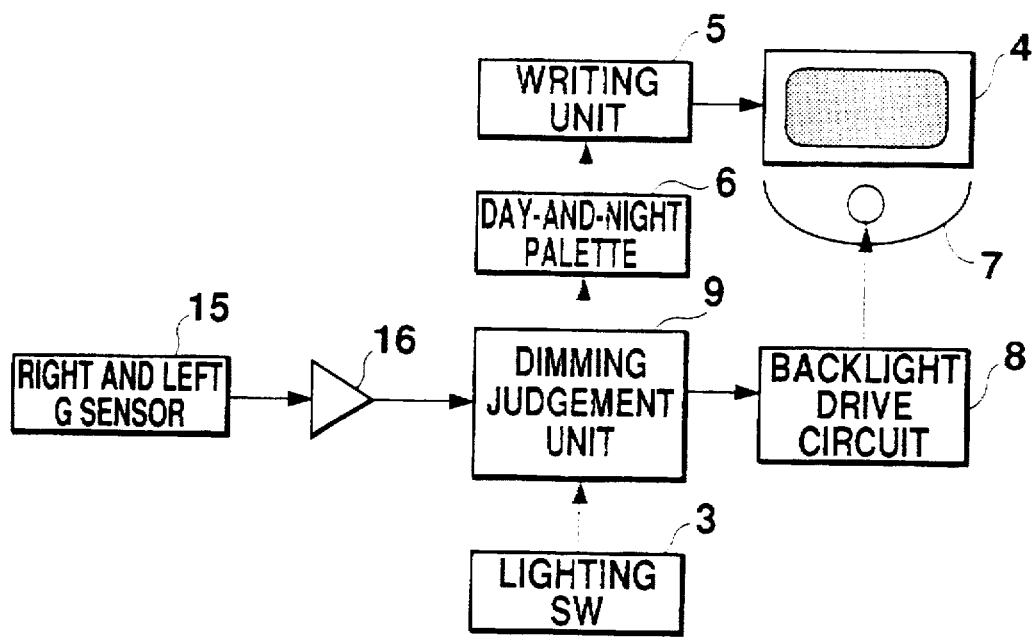

FIG. 12 is a block diagram to show the configuration of a fifth embodiment.

Figure 13:
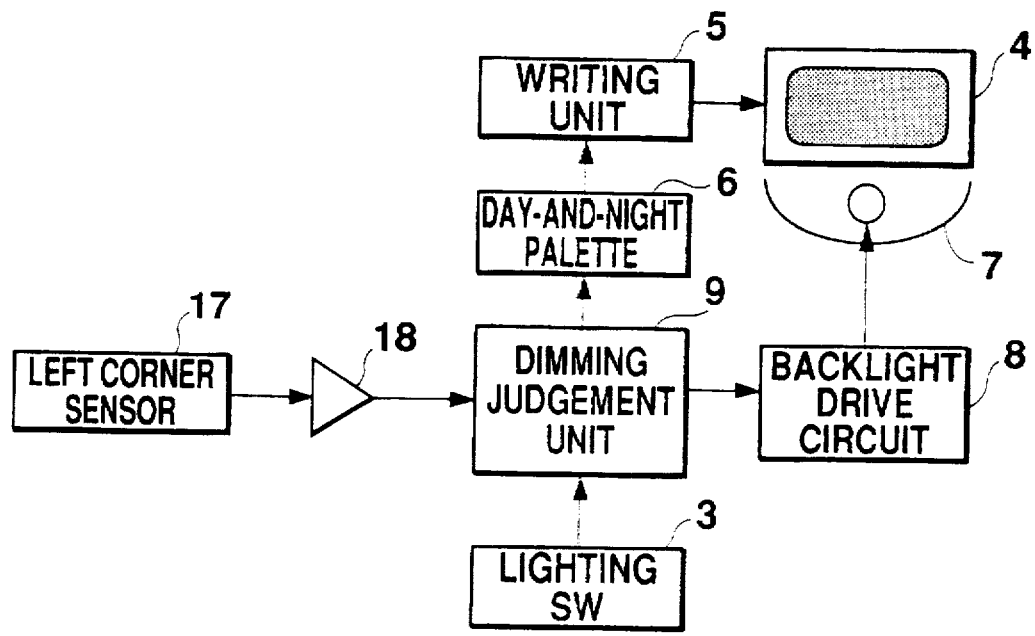

FIG. 13 is a block diagram to show the configuration of a sixth embodiment.

Figure 14:
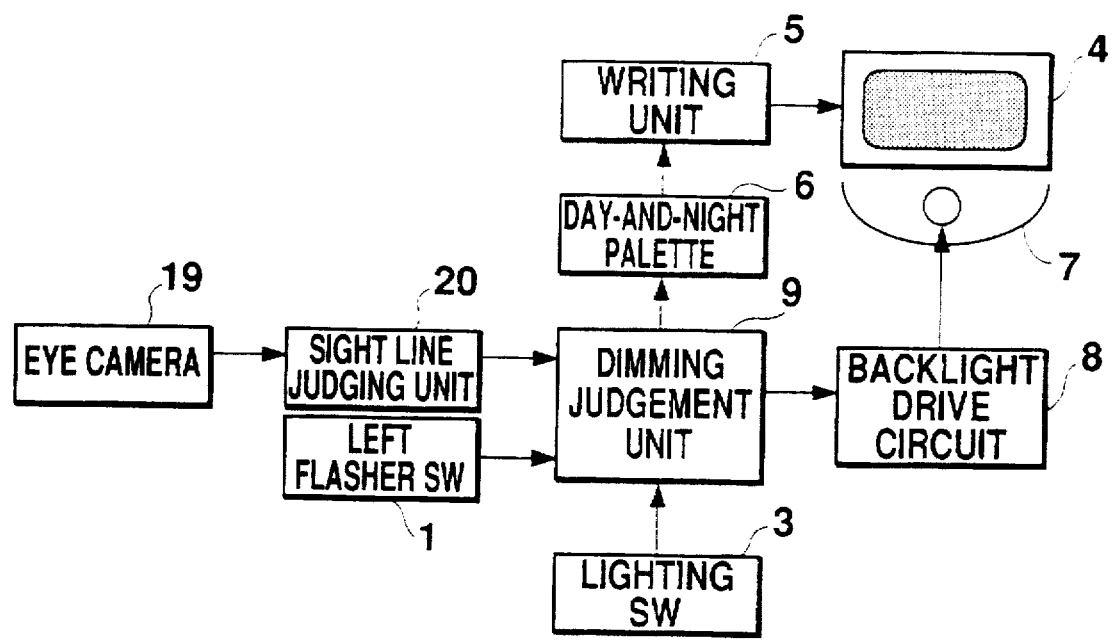

FIG. 14 is a block diagram to show the configuration of a seventh embodiment.

Figure 15:
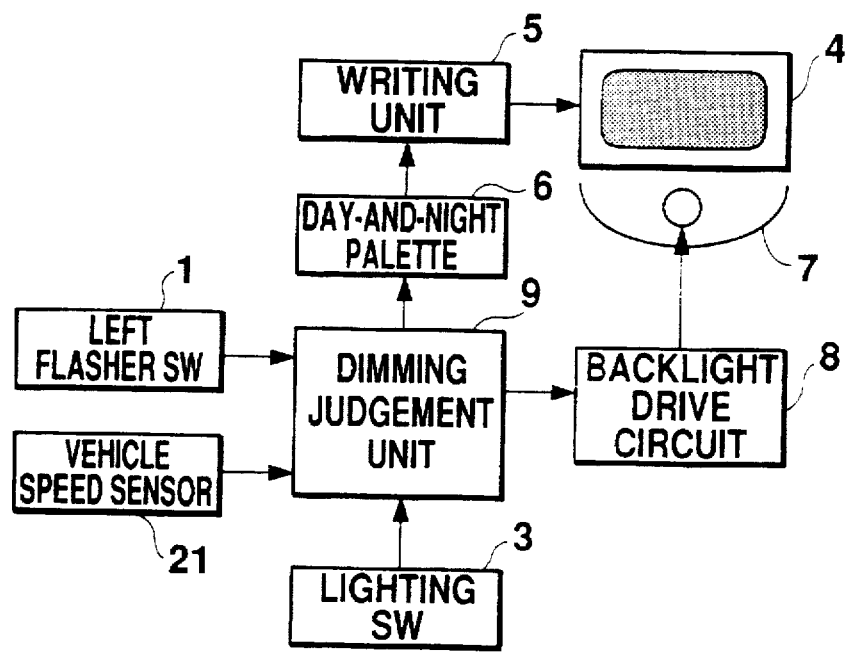

FIG. 15 is a block diagram to show the configuration of an eighth embodiment.

Figure 16:
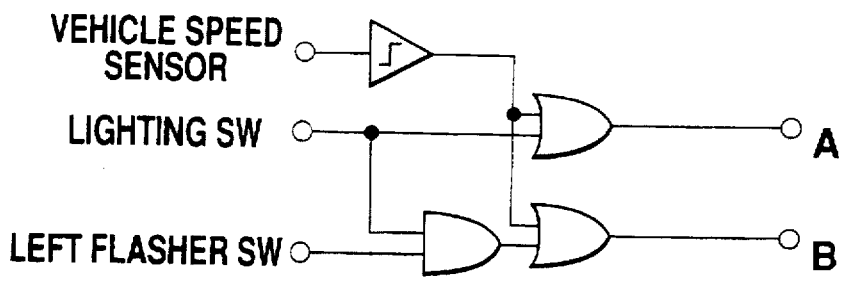

FIG. 16 is a diagram to show an example of the configuration of the dimming judgement unit 9.

Figure 17:
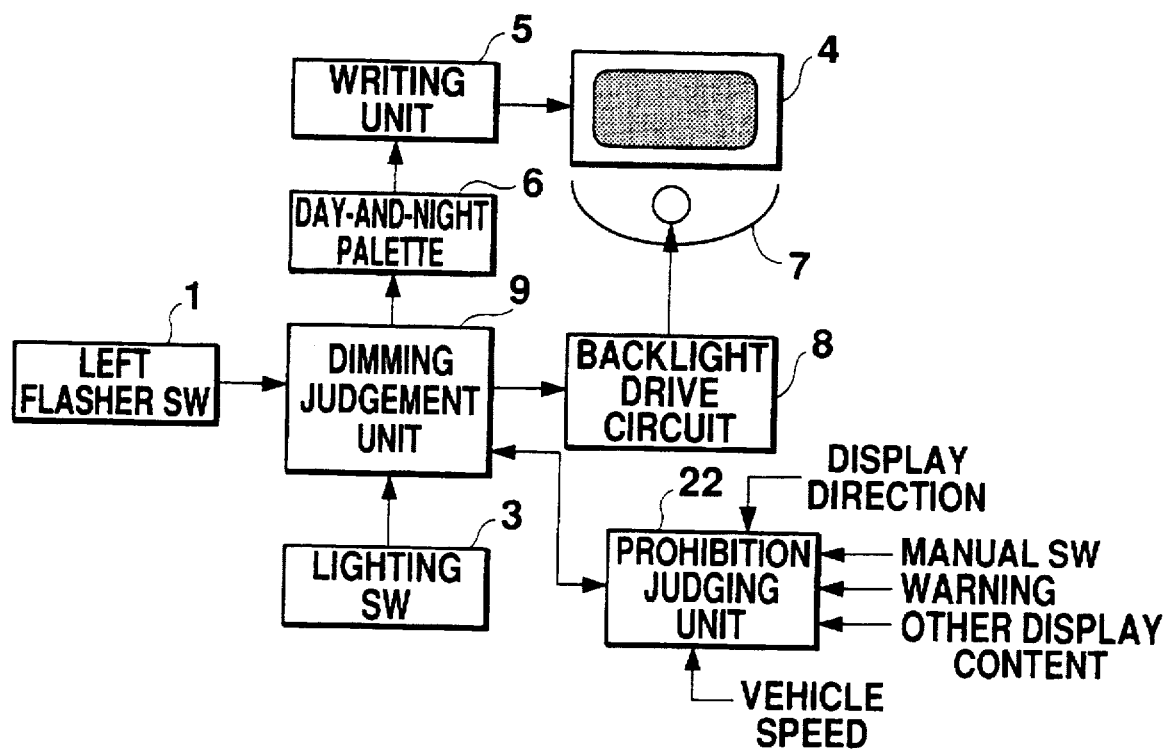

FIG. 17 is a block diagram to show the configuration of a ninth embodiment.

DETAILED DESCRIPTION OF THE PREFERRED EMBODIMENTS

Preferred embodiments (hereinafter referred to as embodiments) of the present invention will be described with reference to the accompanying drawings. It is to be understood that the invention is not limited to the following embodiments. The following embodiments will be described on the assumption that the steering wheel is provided on the right side of a vehicle and the driver can see a display when his or her eyes are turned to the left. Conversely, if a vehicle has the steering wheel on the left side, the driver can see the display when his or her eyes are turned to the right. Left and right would then be inverted.

First Embodiment

FIG. 1 is a block diagram to show the configuration of the first embodiment. A left flasher SW 1 outputs information about whether or not a left flasher is on. A lighting SW 3 outputs information about whether or not head lamps are on. The lighting SW 3 can be automatically on or off in accordance with the darkness.

A display 4 is a liquid crystal display (LCD) showing various types of information in accordance with an image signal from a writing unit 5. The writing unit 5 receives a signal from a day-and-night palette 6 to change the representation (especially, color and hue) on the display 4 depending on day or night conditions. Specifically, the day-and-night palette 6 outputs a relatively bright pattern (based on a bright color tone) for various representations on the display 4 during the day, and a relatively dark pattern (based on a dark color tone) at night. Thus, the representation on the display 4 can be changed depending at day or night to continually provide a relatively easy-to-see representation.

The display 4 has a backlight 7 which controls the brightness of the display 4. The backlight 7 is controlled by a backlight drive circuit 8.

4

A dimming judgement unit 9 judges whether or not it is necessary to dim (one technique of making the representation obscure by darkening the backlight 7) the representation on the display 4 depending on the outputs from the left flasher SW 1 and the lighting SW 3 and controls the representation on the display 4 accordingly. The display 4 is mounted between and ahead of the driver's seat and the front passenger seat or a slightly lower position where normal visibility is not disturbed (on the instrument panel below a windshield).

FIG. 2 shows the configuration of a main part of the dimming judgement unit 9. A signal from the lighting SW 3 is outputted as a signal A without any modification. On the other hand, a signal from the left flasher SW 1 is entered into an AND gate together with the signal from the lighting SW 3, and output from the AND gate is a signal B.

FIG. 3 shows a control method by the day-and-night palette 6. The day-and-night palette 6 selects a relatively dark nighttime palette when A is on (the headlamps are on), regardless of whether B is on or off (regardless of whether the left flasher is on or off), on the other hand, a relatively bright daytime palette is selected when A is off (the headlamps are on), regardless of whether B is on or off (regardless of whether the left flasher is on or off).

FIG. 4 shows a control method of the backlight drive circuit 8. It is seen that a relatively bright daytime luminance is selected when A is off (the head lamps are on) regardless of whether B is on or off. When A is on (the head lamps are on), on the other hand, the backlight 7 is adjusted to a nighttime luminance which is lower than a daytime luminance when B is off (the left flasher is off), and the backlight 7 is adjusted to a nighttime dimmed luminance which is lower than the nighttime luminance when B is on (the left flasher is on).

Thus, according to this embodiment, when the environment is dark in the nighttime or within a tunnel and the left flasher is on, the luminance of the backlight 7 is set to the nighttime dimmed luminance which is lower than the nighttime luminance.

When the left flasher is on, the vehicle is going to turn to the left or make a lane change to the left. In such a situation, the driver will look forward and to the left. Thus, it is highly possible that the display 4 will come into the driver's line of sight. And, it is apparent in view of the signal from the lighting SW 3 that the environment is dark. Therefore, there is a high possibility that the driver feels that the representation on the display 4 is annoying in his or her field of vision.

Under such a condition, this embodiment sets the luminance of the display to be lower than the nighttime luminance. Accordingly, the driver does not feel that his or her field of vision is heavily blocked, so that the driver does not feel the representation on the display 4 annoying.

FIG. 5 shows one example of the above-described control. First, the lighting SW 3 is turned on, and the day-and-night palette 6 changes the palette to a nighttime palette according to a signal from the dimming judgement unit 9. Further, the backlight drive circuit 8 changes the luminance of the backlight 7 to a nighttime luminance. When the left flasher SW 1 is turned on in this state, the backlight drive circuit 8 lowers the luminance of the backlight 7 to the nighttime dimmed luminance. Thus, annoyance caused by the display 4 in the driver's field of vision can be relieved.

Then, when the lighting SW 3 is turned off, it is assumed that the environment has become bright, and the palette is switched to the daytime palette. Also, the backlight is changed to the daytime luminance. In this case, the left flasher remains on. When the head lamps are turned off again in the above-described state, the palette is switched to the nighttime palette, and the backlight 7 is switched to the nighttime dimmed luminance.

By turning off the left flasher, the backlight 7 is changed to the nighttime luminance. Further, when the lighting SW 3 is turned off, the palette is switched to the daytime palette, and the backlight 7 is switched to the daytime luminance.

Thus, by turning the left flasher SW 1 and the lighting SW 3 on or off based on the logic shown in FIG. 3 and FIG. 4, the palette types and the backlight's luminance are changed. Especially, when the lighting SW 3 is turned on, it is assumed that the environment is dark at night (or when the vehicle is passing through a tunnel), and when the left flasher SW 1 is turned on, it is assumed that the driver's line of sight is directed forward and to the left (the display 4 comes into the driver's field of vision); and the luminance of the backlight 7 is lowered to below the nighttime luminance. Accordingly, an annoyance with the display 4 can be prevented.

Second Embodiment

FIG. 6 shows the configuration of a second embodiment. The apparatus according to the second embodiment is provided with a steering angle sensor 10. The output from the steering angle sensor 10 is fed to the dimming judgement unit 9. According to the output from the steering angle sensor 10, the left flasher SW 1 and the lighting SW 3, the dimming judgement unit 9 operates to control the luminance of the backlight 7 by the backlight drive circuit 8.

Such a controlling condition is shown in FIG. 7. The change of the palette by turning on the lighting SW 3 is effected in the same way as in the first embodiment. The change of the backlight 7 to the nighttime dimmed luminance by turning on the left flasher SW 1 with the lighting SW 3 on is also effected in the same way as in the first embodiment.

In this embodiment, it is designed that the backlight 7 maintains the nighttime dimmed luminance even when the left flasher SW 1 is turned off. Further, when the steering angle is returned to neutral, the luminance of the display 4 is changed to the nighttime luminance by the backlight 7. For example, the left flasher SW 1 is turned on and the steering wheel is turned to the left to make a left turn. The left flasher SW 1 is turned off as the steering angle is decreased. At this moment, the vehicle's left turn has yet to be completed, and the driver's line of sight may be still directed to the left. At this time, the nighttime dimmed luminance is maintained by the backlight 7 in this embodiment. Therefore, the driver does not find the representation on the display 4 annoying. Also, when the left turn completes and the steering angle becomes neutral, namely when the driver's line of sight is directed forward, the luminance of the display 4 is returned to the nighttime luminance. Thus, the luminance of the display 4 can be adjusted more preferably by control as described above.

Third Embodiment

FIG. 8 shows a configuration of a third embodiment. The apparatus according to the third embodiment is provided with an illumination sensor 11 for measuring brightness inside or outside the vehicle and a comparator 12 for comparing the output from the illumination sensor 11 with a prescribed reference value instead of the lighting SW 3. Specifically, the illumination sensor 11 detects actual brightness in the driver's sight and judges that the driver's sight is dark at night or in a tunnel when the detected value is less than a given value. The palette and the backlight are then controlled according to the detected result.

The output from the illumination sensor 11 is variable depending on brightness as shown in FIG. 9 (a). The comparator 12 compares the output from the illumination sensor 11 with the reference value as shown in FIG. 9 (b) and outputs L (dark) when the output from the illumination sensor 11 is less than the reference value and H (bright) when it is more than the reference value as shown in FIG. 9 (c). According to the output from the comparator 12, the dimming judgement unit 9 recognizes the brightness of the surroundings and makes the same control as in the above embodiments.

FIG. 8 includes the left flasher SW 1, but not the steering angle sensor 10. The steering angle sensor 10 may be suitably provided in the same way as in the second embodiment.

Fourth Embodiment

FIG. 10 shows the configuration of a fourth embodiment. The apparatus according to the fourth embodiment is provided with a yaw rate sensor 13 for detecting an angular velocity in the vehicle's turning direction and a comparator 14 for comparing the output from the yaw rate sensor 13 with a prescribed reference value instead of the left flasher SW 1 used in the first embodiment.

The output from the yaw rate sensor 13 depends on the angular velocity in the vehicle's turning direction as shown in FIG. 11 (a). The comparator 14 compares the output from the yaw rate sensor 13 with the prescribed reference value and determines that the vehicle is turning as shown in FIG. 11 (b) and (c). The yaw rate sensor 13 here is used to detect a left turn and, when the angular velocity detected by the yaw rate sensor 13 is more than the reference value, it is assumed that the vehicle is making a left turn and the driver's line of sight is directed to the left. Then, the outputs from the yaw rate sensor 13 and from the lighting SW 3 are combined, and the backlight 7 is adjusted to the nighttime dimmed luminance when the surroundings are dark and the vehicle is making a left turn. Thus, driver annoyance with the representation on the display 4 can be prevented. Also, by controlling as described above, the dimming control can be effected, even when the driver does not turn on the left flasher.

Both the yaw rate sensor 13 and the left flasher SW 1 may be provided and used together to assume that the driver's sight line is directed to the left, and the steering angle sensor 10 may also be combined.

Fifth Embodiment

FIG. 12 shows the configuration of a fifth embodiment. The apparatus according to the fifth embodiment is provided with a transverse G sensor 15 for detecting transverse acceleration of a vehicle and a comparator 16 for comparing the output from the transverse G sensor 15 with a reference value in place of the yaw rate sensor 13 used in the fourth embodiment.

Movement of the vehicle in the left direction can be detected according to the output from the transverse G sensor 15. The driver's sight in the left direction can thus be assumed by detecting a left turn or a lane change to the left. Therefore, the same effect as in the previous embodiment can be obtained by the transverse G sensor 15 and the comparator 16.

Sixth Embodiment

FIG. 13 shows the configuration of a sixth embodiment. The apparatus according to the sixth embodiment is provided with a left corner sensor 17 for detecting whether there is any obstacle at the forward left of the vehicle and a comparator 18 for comparing the output from the left corner sensor 17 with a prescribed reference value instead of the yaw rate sensor 13 used in the fourth embodiment.

The left corner sensor 17 transmits and receives, for example, supersonic waves to detect an obstacle located the forward left of the vehicle. The presence of an obstacle can be detected according to the detected value by the comparator 18. For example, if the level of a reflected wave is more than the reference value, the presence of an obstacle is detected.

Also, when there is an obstacle, the left corner sensor 17 issues an alarm sound to notify the existence of the obstacle to the driver and lowers the luminance of the display 4 in the nighttime from the nighttime luminance to the nighttime dimmed luminance. According to the alarm, it is highly possible that the driver will turn his or her line of sight to the obstacle. Therefore, this embodiment can effectively prevent that the driver may feel the representation on the display 4 is annoying. Besides, the left corner sensor 17 may be used together with another detection means. An alarm about the detection of an obstacle by the left corner sensor 17 may be given as the alarm sound with a lamp blinked or as an audible warning, "Obstacle on your left".

Seventh Embodiment

FIG. 14 shows the configuration of a seventh embodiment. The apparatus according to the seventh embodiment is provided with an eye camera 19 for taking a picture of the driver's eyes and a sight line judging unit 20 which makes image processing of the output from the eye camera 19 and judges whether or not the driver's eyes are directed to the left in addition to the flasher SW 1 used in the first embodiment.

By means of the eye camera 19 and the sight line judging unit 20, the driver's sight line is directly detected, and it is judged whether or not the display 4 comes into the driver's sight. Therefore, the detection can be performed most directly and securely. And, dimming processing is performed when it is detected that the driver's line of sight is directed to the left according to the signal from the eye camera 19 with the left flasher SW 1 on. Control can thus be made directly and securely. Filtering may be effected to disregard the movement of the sight line in a very short time, so that an excessively frequent change of luminance can be avoided.

Eighth Embodiment

FIG. 15 shows the configuration of an eighth embodiment. The apparatus according to the eighth embodiment refers to the value detected by a vehicle speed sensor 21 in addition to the left flasher SW 1 used in the first embodiment. Specifically, a signal A is turned on or off according to an output from the lighting SW 3 and a signal B is obtained by the AND of the lighting SW 3 and the left flasher SW 1 as shown in FIG. 16. And, the signals A and B thus obtained are turned on when the vehicle speed is lower than a prescribed level according to the output from the vehicle speed sensor.

When the vehicle is running at a low speed, the driver can watch the display 4 closely. In such circumstances, an excessively bright representation on the display 4 is annoying. Such a disadvantage can be remedied by changing the luminance to the nighttime luminance when the vehicle is running at low speed. Also, when the vehicle is driven at low speed to enter a garage, the driver does not need to read information shown on the display 4 instantaneously, and the display 4 is not required to be bright.

In addition, when the vehicle is not moving (the vehicle speed is zero), the driver can closely observe the display 4, so it is desirable to perform the dimming process in the same way as above. For example, when the vehicle is stopping at an intersection, the vehicle interior is bright and the driver's face is lighted if the display 4 is not dimmed, possibly with unfavorable results. Therefore, it is preferable to dim the display 4 when the vehicle is stationary.

During the day when the lighting SW 3 is off, the palette is changed to the nighttime palette because the vehicle speed is less than the prescribed value, and at night when the lighting SW 3 is on, the luminance may be changed to the nighttime dimmed luminance when the vehicle speed is less than the prescribed value.

Ninth Embodiment

FIG. 17 shows the configuration of a ninth embodiment. The apparatus according to this embodiment is provided with a prohibition judging unit 22 which is connected to the dimming judgement unit 9. The present invention controls to lower the luminance of the display 4 to the nighttime dimmed luminance as described above. But, this control may be preferably prohibited under some conditions. For example, the prohibition judging unit 22 determines whether the above control should be prohibited in the following cases and prohibits the dimming control by means of the dimming judgement unit 9, even when the above-described conditions are satisfied.

(i) When a manual switch for performing the dimming control is provided and the dimming control is prohibited by the user at his or her will.

(ii) When the display is faced to the front passenger seat.

(iii) When the display shows alarm information such as a high water temperature or a low fuel level. Such alarm information should be given to the driver as soon as possible, and it is preferable to call the driver's attention repeatedly. Accordingly, when such urgent information is shown on the display, it is preferable to prohibit the dimming control.

Such information is generally displayed in red, and the control may be performed according to the given information. Also, the dimming judgement unit may determine whether the displayed content includes predetermined alarm information to make decisions as to whether or not the dimming control should be prohibited.

(iv) When the display shows that the vehicle is approaching a sharp corner or shows a lane change to the right.

In such a case, the driver is required to pay attention to the forward or right direction while the vehicle is making a lane change to the left or turning to the left. It is therefore better not to perform the dimming control.

(v) When the vehicle speed is higher than a prescribed value.

When the vehicle is running at a high speed along a highway, the driver's eyes are focused at a distance. Therefore, even when the driver's eyes are moved to the left, the display 4 may not greatly enter the driver's line of sight because eye movement is slight. Dimming control is then not performed.

Thus, it is determined that the vehicle is not in a situation to perform the dimming control by the prohibition judging unit 22, and the dimming control is prohibited, so that the dimming control can be performed more appropriately.

Other Configurations

The above descriptions have been made on various types of configurations separately, but such configurations may be combined appropriately.

The above-described dimming control is performed on the backlight for the LCD, but the same effect can be obtained by controlling the luminance when a CRT is used. Furthermore, a color may be changed to be blackish instead of performing the dimming control. And, since sea or the like is indicated relatively bright at night, the dimming control may be performed to simply lower the luminance of the sea portion. In other words, the dimming control may be partially performed rather than on the enter screen. Further, dimming control may be performed to turn off the screen.

Vehicles provided with displays often have navigation systems. When a route is determined by the navigation system, an intersection where the vehicle is making a left turn and a location where the driver must pay attention to the left can be recognized in advance. Thus, by combining such information, the movement of the driver's eyes to the left is properly assumed, and the dimming control is performed appropriately.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. An automobile screen control apparatus for controlling the screen of a display which is mounted on an automobile to show various types of information, the apparatus comprising:

means for predicting directional motion of a driver's sight;

means for judging whether or not the display comes within the driver's line of sight in response to the predicted directional motion of the driver's sight; and means for making the screen of the display inconspicuous when it is judged that the display comes within the driver's line of sight.

2. The apparatus according to claim 1, wherein said control apparatus lowers the luminance of the display when it is judged that the display comes within the drivers line of sight.

3. The apparatus according to claim 1 further having a brightness detector for detecting brightness of the environment, wherein said control apparatus makes the screen of the display inconspicuous based on the result detected by the brightness detector.

4. The apparatus according to claim 3, wherein said brightness detector detects brightness or darkness according to whether head lamps are on or off.

5. The apparatus according to claim 3, wherein said brightness detector is an illumination sensor for detecting brightness.

6. The apparatus according to claim 1, determines whether the display comes within sight of the driver based on the result detected whether or not there is an obstacle ahead of the automobile and in the direction where the display is mounted when viewed from the driver.

7. The apparatus according to claim 1, wherein the driver's line of sight is predicted according to whether a turn signal flasher is turned on.

8. The apparatus according to claim 1 further having a steering angle sensor for a steering wheel, wherein the driver's line of sight is predicted according to a turn signal lamp which is on and the state of the steering wheel.

9. The apparatus according to claim 1 further having a yaw rate sensor for detecting a yaw rate of the automobile, wherein the driver's line of sight is predicted according to the result detected by the yaw rate sensor.

10. The apparatus according to claim 1 further having a transverse acceleration sensor for detecting a transverse acceleration of the automobile, wherein the driver's line of sight is predicted according to the result detected by the transverse acceleration sensor.

11. The apparatus according to claim 1 further having an eye camera for taking a picture of the driver's eyes, and the driver's line of sight is predicted according to the pictured result of the eye camera.

12. The apparatus according to claim 1 further having a vehicle speed detector for detecting the vehicle speed, wherein the display is prohibited from being changed to an inconspicuous state when it is determined that the vehicle speed is higher than a predetermined value.

13. The apparatus according to claim 1, wherein the control apparatus judges urgency of the content indicated on the display and prohibits the display from being changed to an inconspicuous state when it is determined that the urgency is high.

14. An apparatus for controlling the screen of the display which is mounted on a vehicle to show various types of information, comprising:

brightness judging means for judging brightness of the environment, sight predicting means for predicting whether the display screen is within the driver's sight, judging means for judging prominence of the display according to the judged result by said brightness judging means and the predicted result by said sight predicting means, and screen control means for making the screen of the display inconspicuous when it is determined by the judging means that the display is conspicuous and within the driver's line of sight.

* * * * *